US012378928B2

(12) United States Patent
Takayanagi et al.

(10) Patent No.: US 12,378,928 B2
(45) Date of Patent: Aug. 5, 2025

(54) ENGINE CONTROL DEVICE, ENGINE CONTROL SYSTEM, AND ENGINE CONTROL PROGRAM

(71) Applicant: MITSUBISHI HEAVY INDUSTRIES ENGINE & TURBOCHARGER, LTD., Sagamihara (JP)

(72) Inventors: Ko Takayanagi, Sagamihara (JP); Yosuke Kitamura, Sagamihara (JP); Takayoshi Kuramoto, Sagamihara (JP); Ryo Sase, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/728,400

(22) PCT Filed: Jan. 20, 2023

(86) PCT No.: PCT/JP2023/001609
§ 371 (c)(1),
(2) Date: Jul. 11, 2024

(87) PCT Pub. No.: WO2023/145622
PCT Pub. Date: Aug. 3, 2023

(65) Prior Publication Data
US 2025/0154919 A1    May 15, 2025

(30) Foreign Application Priority Data
Jan. 26, 2022    (JP) .................... 2022-010354

(51) Int. Cl.
*B60T 7/12*    (2006.01)
*F02D 41/00*    (2006.01)
(Continued)

(52) U.S. Cl.
CPC ....... *F02D 41/401* (2013.01); *F02D 41/0097* (2013.01); *F02D 41/1401* (2013.01);
(Continued)

(58) Field of Classification Search
CPC ........... F02D 41/1401; F02D 2041/141; F02D 2041/1409; F02D 31/007; F02D 41/083
(Continued)

(56) References Cited

U.S. PATENT DOCUMENTS 5,525,043 A    6/1996 Lukich
9,162,184 B2*  10/2015 Ide ..................... F01N 13/0097
(Continued)

FOREIGN PATENT DOCUMENTS

CN    105422296 A    3/2016
CN    112081676 A    12/2020
(Continued)

OTHER PUBLICATIONS

Extended European Search Report for European Application No. 23746835.0, dated Mar. 4, 2025.
(Continued)

*Primary Examiner* — Logan M Kraft
*Assistant Examiner* — James J Kim
(74) *Attorney, Agent, or Firm* — Birch, Stewart, Kolasch & Birch, LLP

(57) ABSTRACT

An engine control device includes: an injection command unit for outputting a fuel injection amount command value; a first calculation unit for outputting a fuel injection amount obtained by FB calculation based on an engine speed deviation to the injection command unit as a basic fuel injection amount; and a second calculation unit for outputting a fuel injection amount obtained by FF calculation based on an engine load at present of an engine to the injection command unit as a FF fuel injection amount. The
(Continued)

fuel injection amount command value switches from a fuel injection amount calculated based on the basic fuel injection amount by the injection command unit to a fuel injection amount calculated based on a value obtained by adding the FF fuel injection amount to the basic fuel injection amount, if it is determined that a load application state has occurred in which the engine load before a prescribed time, which is not greater than a prescribed value, increases by not less than a variation threshold.

12 Claims, 10 Drawing Sheets

(51) Int. Cl.
  *F02D 41/14* (2006.01)
  *F02D 41/40* (2006.01)
  *F02D 29/06* (2006.01)

(52) U.S. Cl.
  CPC ...... *F02D 29/06* (2013.01); *F02D 2041/1409* (2013.01); *F02D 2041/141* (2013.01); *F02D 2200/1002* (2013.01); *F02D 2200/101* (2013.01)

(58) Field of Classification Search
  USPC .......................................... 701/103
  See application file for complete search history.

(56) References Cited

U.S. PATENT DOCUMENTS

| | | | |
|---|---|---|---|
| 10,487,769 B2 * | 11/2019 | Imai | ...................... F02M 69/046 |
| 12,055,107 B2 * | 8/2024 | Ambaliya | ................. F02D 1/02 |
| 2004/0007211 A1 | 1/2004 | Kobayashi | |
| 2006/0196469 A1 | 9/2006 | Kuo et al. | |
| 2017/0370319 A1 * | 12/2017 | Homant | .............. F02D 41/3005 |

FOREIGN PATENT DOCUMENTS

| | | |
|---|---|---|
| JP | 8-101716 A | 4/1996 |
| JP | 2001-317393 A | 11/2001 |
| JP | 2014-125949 A | 7/2014 |
| JP | 6356493 B2 | 7/2018 |
| JP | 6465013 B2 | 2/2019 |
| WO | WO 2010/113654 A1 | 10/2010 |
| WO | WO 2015/186607 A1 | 12/2015 |

OTHER PUBLICATIONS

International Search Report for PCT/JP2023/001609 mailed on Feb. 28, 2023.
Written Opinion of the International Searching Authority for PCT/JP2023/001609 mailed on Feb. 28, 2023.

* cited by examiner

FIG. 5

| Determination condition of low-load determination |||
|---|---|---|
| AND | Condition N1 | Engine load before prescribed time ≤ prescribed value |
| | Condition N2 | Actual engine speed ≤ second rotation speed threshold |

FIG. 7A

| | Determination condition of load increase determination | |
|---|---|---|
| AND | Load increase determination A1 | First load deviation ≥ variation threshold |
| | Load increase determination A2 | Engine speed deviation ≤ first rotation speed threshold |
| | Load increase determination A3 | Second load deviation ≥ variation threshold |

FIG. 7B

| | Determination condition of load increase determination | |
|---|---|---|
| AND | Load increase determination B1 | Derivative value of engine load at present ≥ derivative threshold |
| | Load increase determination A2 | Engine speed deviation ≤ first rotation speed threshold |
| | Load increase determination A3 | Second load deviation ≥ variation threshold |

ENGINE CONTROL DEVICE, ENGINE CONTROL SYSTEM, AND ENGINE CONTROL PROGRAM

TECHNICAL FIELD

The present disclosure relates to an engine control device, an engine control system, and an engine control program.

This application claims the priority of Japanese Patent Application No. 2022-010354 filed on Jan. 26, 2022, the content of which is incorporated herein by reference.

BACKGROUND

An engine control device exemplified in Patent Document 1 controls the opening degree of a throttle disposed in an engine. More specifically, the engine control device adds a throttle opening degree obtained by feedforward calculation based on an engine load to a throttle opening degree obtained by feedback calculation based on a deviation between an actual engine speed and a target engine speed. An opening command value obtained by the addition is sent to a stepping motor for controlling the throttle opening degree, controlling an engine speed.

CITATION LIST

Patent Literature

Patent Document 1: JP2001-317393A

SUMMARY

Technical Problem

When an engine load which has remained at a low value increases to some extent, it is necessary to quickly increase a fuel injection amount so that high engine drive responsiveness is achieved. However, when the engine load is low, the amount of air supplied to the engine is small, so the air excess ratio may become insufficient as the fuel injection amount increases. As a result, various problems can occur, such as an increase in toxic substance contained in an exhaust gas, a decrease in thermal efficiency of the engine, or engine stalling. Therefore, when the engine load which has remained at the low value increases, it is necessary to quickly increase the fuel injection amount at an appropriate timing so that the air excess ratio does not become insufficient.

An object of the present disclosure is to provide an engine control device, an engine control system, and an engine control program, which are capable of quickly increasing the fuel injection amount at the appropriate timing while suppressing the insufficient air excess ratio, when the engine load which has remained at the low value increases.

Solution to Problem

An engine control device according to at least one embodiment of the present disclosure, includes: an injection command unit for outputting a fuel injection amount command value indicating a fuel injection amount supplied to an engine; a first calculation unit for outputting a fuel injection amount obtained by feedback calculation based on an engine speed deviation which is a deviation between an actual engine speed and a target engine speed of the engine to the injection command unit as a basic fuel injection amount; a second calculation unit for outputting a fuel injection amount obtained by feedforward calculation based on an engine load at present of the engine to the injection command unit as a feedforward fuel injection amount; and a first determination unit for determining whether a load application state has occurred in which the engine load before a prescribed time, which is not greater than a prescribed value, increases by not less than a variation threshold. The engine control device is configured to switch from a normal control mode where the injection command unit outputs, as the fuel injection amount command value, a first fuel injection amount calculated based on the basic fuel injection amount to a load application control mode where the injection command unit outputs, as the fuel injection amount command value, a second fuel injection amount calculated based on a value obtained by adding the feedforward fuel injection amount to the basic fuel injection amount, if the first determination unit determines that the load application state has occurred.

An engine control system according to at least one embodiment of the present disclosure, includes: the engine; a rotation speed sensor for detecting a rotation speed of the engine; a load sensor for detecting the engine load of the engine; the above-described engine control device for acquiring a detection result of each of the rotation speed sensor and the load sensor; and a fuel injection part disposed in the engine and configured to inject fuel in accordance with the fuel injection amount command value output from the injection command unit of the engine control device.

An engine control program according to at least one embodiment of the present disclosure, configured to cause an engine device which is a computer to execute: an injection command step of outputting a fuel injection amount command value supplied to an engine; a first calculation step of outputting, as a basic fuel injection amount acquired in the injection command step, a fuel injection amount obtained by feedback calculation based on an engine speed deviation which is a deviation between an actual engine speed and a target engine speed of the engine; a second calculation step of outputting, as a feedforward fuel injection amount acquired in the injection command step, a fuel injection amount obtained by feedforward calculation based on an engine load at present of the engine; and a first determination step of determining whether a load application state has occurred in which the engine load before a prescribed time, which is not greater than a prescribed value, increases by not less than a variation threshold. The engine control program causes the engine device to switch from a normal control mode where a first fuel injection amount calculated based on the basic fuel injection amount is output as the fuel injection amount command value in the injection command step to a load application control mode where a second fuel injection amount calculated based on a value obtained by adding the feedforward fuel injection amount to the basic fuel injection amount is output as the fuel injection amount command value in the injection command step, if the first determination step determines that the load application state has occurred.

Advantageous Effects

According to the present disclosure, it is possible to provide an engine control device, an engine control system, and an engine control program, which are capable of quickly increasing a fuel injection amount at an appropriate timing while suppressing the insufficient air excess ratio.

BRIEF DESCRIPTION OF DRAWINGS

FIG. 5 is a conceptual table showing determination conditions of a low-load determination unit according to an embodiment.

FIG. 7A is a conceptual table showing determination conditions of a load increase determination unit according to an embodiment.

FIG. 7B is a conceptual table showing determination conditions of the load increase determination unit according to another embodiment.

DETAILED DESCRIPTION

Figure 1:
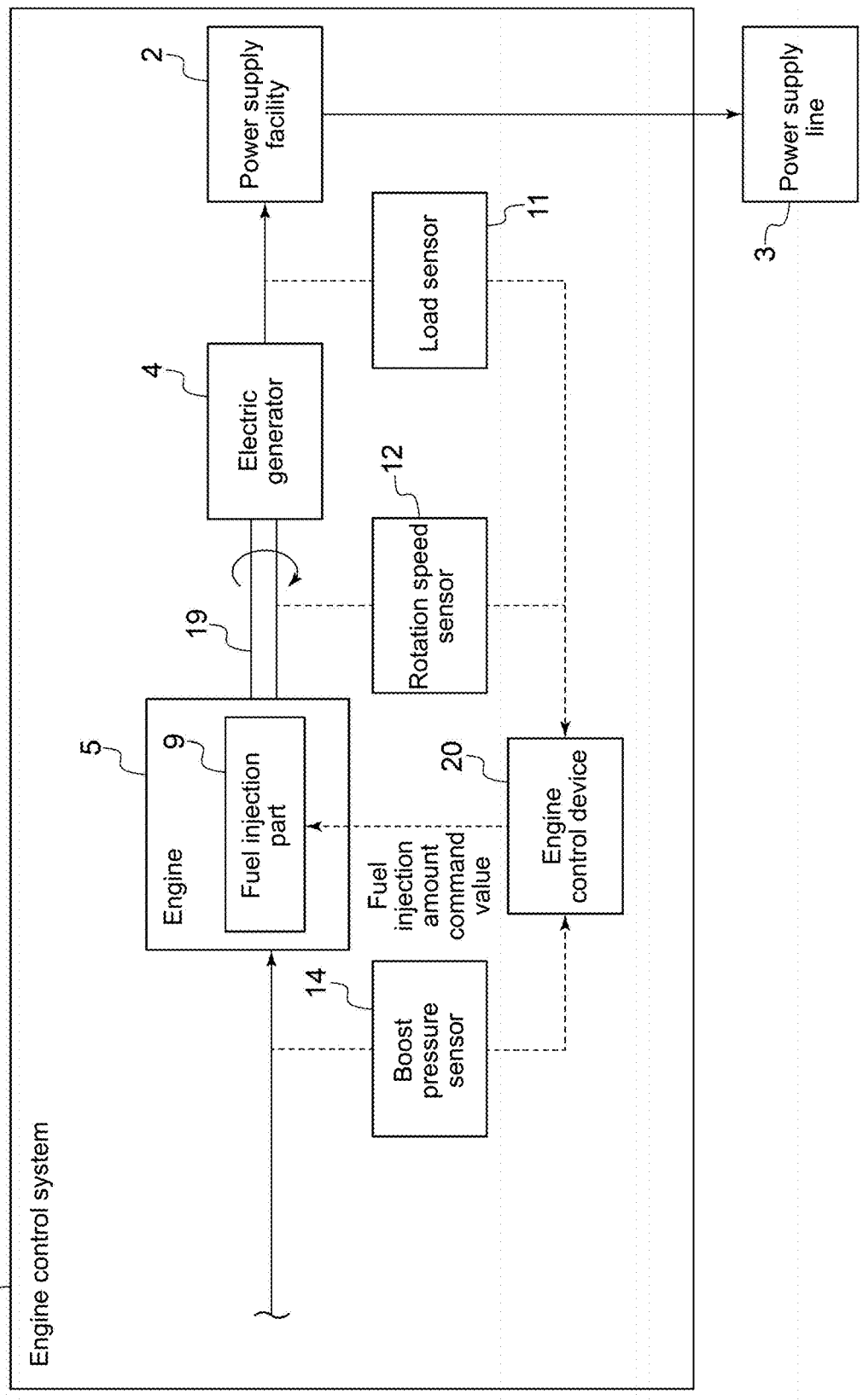
FIG. 1 is a conceptual diagram of an engine control system according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference signs and may not be described again in detail.

1. Exemplification of Overview of Engine Control System 1

FIG. 1 is a conceptual diagram of an engine control system 1 according to an embodiment of the present disclosure. The engine control system 1 of the present embodiment includes an engine 5, an engine control device 20 for controlling the engine 5, an electric generator 4 connected to the engine 5 via a rotational shaft 19, and a power supply facility 2 for supplying electric power generated by the electric generator 4 to a power supply line 3. The engine 5 is, for example, an internal combustion engine such as a diesel engine. The engine control system 1 also includes a boost pressure sensor 14 for detecting a boost pressure of air supply to the engine 5. The detection result of the boost pressure sensor 14 is sent to the engine control device 20. Further, the engine 5 is provided with a fuel injection part 9 which may be, for example, an injector. In the present example, mechanical energy is obtained by mixing and burning air flowing through an air supply channel 8 and fuel injected by the fuel injection part 9, rotating the rotational shaft 19. The electric power generated by the electric generator 4 operating as the rotational shaft 19 rotates is supplied to the power supply line 3 via the power supply facility 2. Meanwhile, when a predetermined operation is performed on the power supply facility 2, the electric generator 4 and the power supply line 3 become separate systems, and the power supply from the electric generator 4 to the power supply line 3 is cut off.

The engine control system 1 according to an embodiment further includes a rotation speed sensor 12 for detecting a rotation speed of the engine 5, and a load sensor 11 for detecting an engine load of the engine 5. The rotation speed sensor 12 of the present example detects a rotation speed of the rotational shaft 19. The detection result (rpm signal) of the rotation speed sensor 12 is sent to the engine control device 20. Further, the load sensor 11 of the present example is a power transducer for measuring the electric power generated by the electric generator 4. The electric power generated by the electric generator 4 increases as output power of the engine 5 increases, so the measurement result of the power transducer can be regarded as the engine load. The detection result (KW signal) of the load sensor 11 is sent to the engine control device 20. The load sensor 11 according to another embodiment may be a torque sensor for measuring a torque of the rotational shaft 19.

The engine control device 20 of the present embodiment controls the fuel injection part 9 based on the respective detection result of each of the load sensor 11, the rotation speed sensor 12, and the boost pressure sensor 14. Further, the fuel injection part 9 injects fuel according to an injection amount command value sent from the engine control device 20.

While the electric generator 4 and the power supply line 3 are in separate systems, the engine load of the engine 5 is lower than, for example, a rated load of the engine 5, and an engine speed which is the rotation speed of the engine 5 is low. In the following description, drive of the engine 5 in which the engine load is not greater than a prescribed value may be referred to as low-load drive. The prescribed value is at most 5% of the rated load of the engine 5. The low-load drive is a concept that includes driving the engine 5 with the engine load which can be considered to be substantially zero.

While the engine 5 is driven under low load, the amount of air supplied to the engine 5 is small, so the air excess ratio may become insufficient if the fuel injection amount by the fuel injection part 9 is too large. On the other hand, even while the engine 5 is driven under low load, for example, if an operation for connecting the electric generator 4 to the power supply line 3 is started in the power supply facility 2 and the engine load increases to a certain degree, it is desirable that the fuel injection amount increases quickly. This is because if the engine 5 can respond quickly to the increase in the engine load due to the rapid increase in the fuel injection amount, the amount of the electric power supplied from the electric generator 4 to the power supply line 3 will rise quickly.

In some embodiments of the present disclosure, when the engine load which has remained at a low value increases to some extent, the engine control device 20 rapidly increases the fuel injection amount. Meanwhile, when the increase in the engine load is small, the engine control device 20 does not rapidly increase the fuel injection amount. Therefore, when the engine load increases in the low-load drive, the fuel injection amount increases rapidly only at a necessary timing.

The engine control device 20 is configured by a computer, and includes a processor, a memory, and an external communication interface. The processor is, for example, CPU, GPU, MPU, DSP, or a combination of these. A processor according to another embodiment may be implemented by an integrated circuit such as PLD, ASIC, FPGA, MCU, or the like. The memory is configured to temporarily or non-temporarily store various data, and is implemented by at least one of RAM, ROM, or a flash memory, for example. According to an instruction of a program loaded into the memory, the processor appropriately acquires data indicating the detection result of each of the load sensor 11, the rotation speed sensor 12, and the boost pressure sensor 14, and processes the various data.

2. Exemplification of Specific Configuration of Engine Control Device 20

Figure 2:
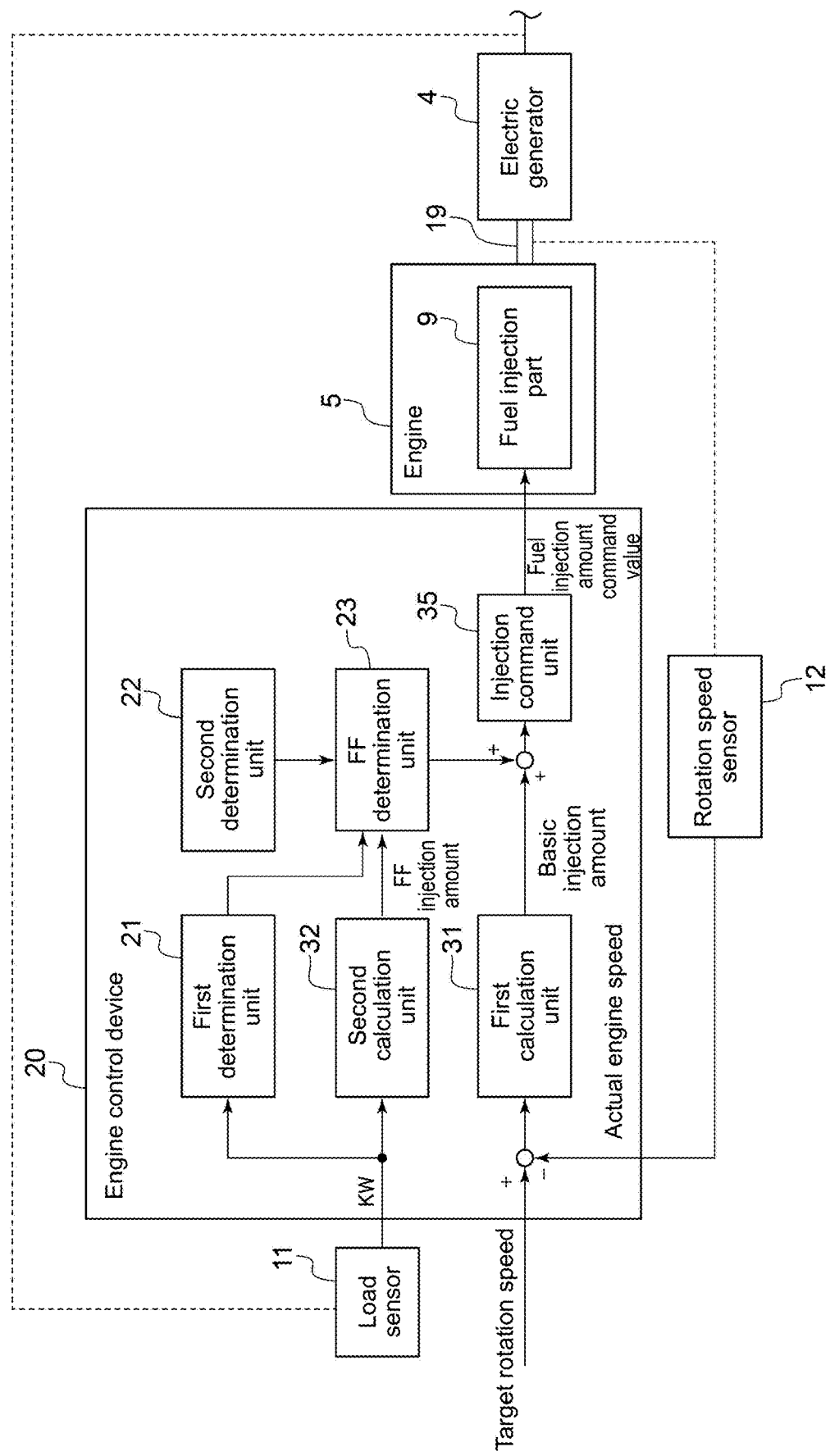
FIG. 2 is a conceptual diagram of an engine control device according to an embodiment.

FIG. 2 is a conceptual diagram of the engine control device 20 according to an embodiment of the present disclosure. The engine control device 20 includes an injection command unit 35 for outputting to the fuel injection part 9 a fuel injection amount command value indicating the fuel injection amount supplied to the engine 5, and a first calculation unit 31 and a second calculation unit 32 for respectively outputting calculation results to the injection command unit 35.

The first calculation unit 31 is configured to output a fuel injection amount obtained by feedback calculation (hereinafter also referred to as FB calculation) to the fuel injection part 9 as a basic fuel injection amount. The FB calculation in the present example is executed based on an engine speed deviation which is a deviation between an actual engine speed and a target engine speed of the engine 5. The actual engine speed of the engine 5 is, for example, latest data (current data) indicated by the detection result of the rotation speed sensor 12. The first calculation unit 31 acquires the engine speed deviation by subtracting the actual engine speed at present from the target engine speed. The result of the FB calculation by the first calculation unit 31 is reflected in the fuel injection amount command value sent from the injection command unit 35 to the fuel injection part 9. Then, the rotation speed of the rotational shaft 19, which changes in accordance with the fuel injection amount of the fuel injection part 9, is detected by the rotation speed sensor 12 and returned as an input value to the first calculation unit 31. Whereby, feedback control (hereinafter also referred to as FB control) of the engine speed is realized. The FB control in the present embodiment is PID control, and the FB calculation in the first calculation unit 31 is PID calculation. FB control according to another embodiment may be P control or PI control.

Further, the basic fuel injection amount output by the first calculation unit 31 may not directly be output to the injection command unit 35. For example, limit processing may be applied to limit the basic fuel injection amount output from the first calculation unit 31 to not greater than an upper limit fuel injection amount, and data subjected to the limit processing may be input to the fuel injection part 9. The above-described upper limit fuel injection amount may vary depending on the amount of air supplied to the engine 5. For example, the engine control device 20 may change the upper limit fuel injection amount based on the detection results of the rotation speed sensor 12 and the boost pressure sensor 14 so that the air excess ratio falls within an appropriate range.

The second calculation unit 32 is configured to output a fuel injection amount obtained by feedforward calculation (hereinafter also referred to as FF calculation) to the injection command unit 35 as a feedforward fuel injection amount. Hereinafter, the feedforward fuel injection amount may be referred to as the FF fuel injection amount. The FF calculation in the present example is executed based on the engine load at present. More specifically, the latest data indicating the detection result of the load sensor 11 is subjected to low-pass filter processing, and the FF fuel injection amount is obtained based on a derivative value of the processed data. In the present example, the limit processing is further applied to limit the obtained FF fuel injection amount to be not greater than a predetermined value. The FF fuel injection amount thus obtained is added to the basic fuel injection amount output from the first calculation unit 31. Feedforward control (hereinafter also referred to as FF control) of the engine speed is executed by reflecting the fuel injection amount obtained by the addition in the fuel injection amount command value in the injection command unit 35. The fuel injection amount obtained by adding the FF fuel injection amount to the basic fuel injection amount (or the fuel injection amount obtained by adding the FF fuel injection amount to the basic fuel injection amount subjected to the limit processing) may not directly be input to the injection command unit 35. For example, limit processing may be applied to limit the fuel injection amount to be not greater than an upper limit value, and the processed fuel injection amount may be input to the injection command unit 35. Further, the detection result of the load sensor 11 may not directly be input to the second calculation unit 32 and, for example, data obtained by sequentially executing the limit processing and maximum likelihood estimation processing on the detection result may be input to the second calculation unit 32.

The engine control device 20 of the present embodiment is configured to switch between a normal control mode in which only the basic fuel injection amount of the basic fuel injection amount or the FF fuel injection amount is reflected in the fuel injection amount command value and a load application control mode in which both the basic fuel injection amount and the FF fuel injection amount are reflected in the fuel injection amount command value. When the engine control device 20 enters the normal control mode, the injection command unit 35 outputs, as the injection amount command value, a first fuel injection amount calculated based on the basic fuel injection amount. When the engine control device 20 enters the load application control mode, the injection command unit 35 outputs, as the injection amount command value, a second fuel injection amount calculated based on a value obtained by adding the FF fuel injection amount to the basic fuel injection amount. The second fuel injection amount is not less than the first fuel injection amount. If a large engine load does not occur while the engine 5 is driven under low load, it is unnecessary to quickly increase the fuel injection amount and the engine control device 20 is in the normal control mode. On the other hand, if the engine load increases to a certain extent while the engine 5 is driven under low load, it is necessary to quickly increase the fuel injection amount, so the engine control device 20 switches from the normal control mode to the load application control mode.

Whether the above-described switching occurs depends on a determination result of a first determination unit 21 which is a component of the engine control device 20. The first determination unit 21 is configured to determine, for example, based on the detection result of the load sensor 11, whether a load application state has occurred in which the engine load before a prescribed time, which is not greater than the prescribed value, increases by not less than a variation threshold. The detection result of the load sensor 11 input to the first determination unit 21 may sequentially be subjected to the limit processing and the maximum likelihood estimation processing. The prescribed time is sufficiently longer than a time corresponding to a reading frequency of each of the load sensor 11 and the rotation speed sensor 12. Further, the variation threshold is a constant of at least 25% of the rated load of the engine 5. The variation threshold is stored in the memory configuring the engine control device 20.

Figure 3:
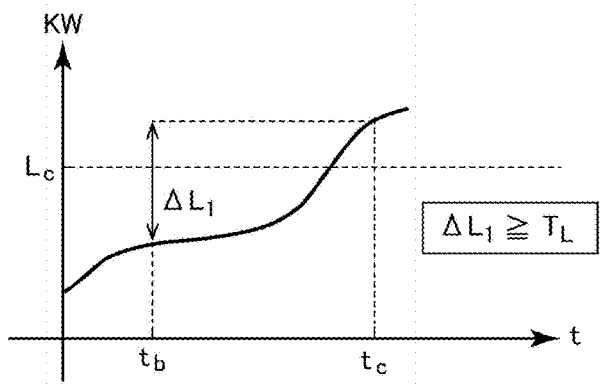
FIG. 3 is a conceptual view showing a relationship between a temporal transition of an engine load and a determination result of a first determination unit according to an embodiment.
Figure 3:
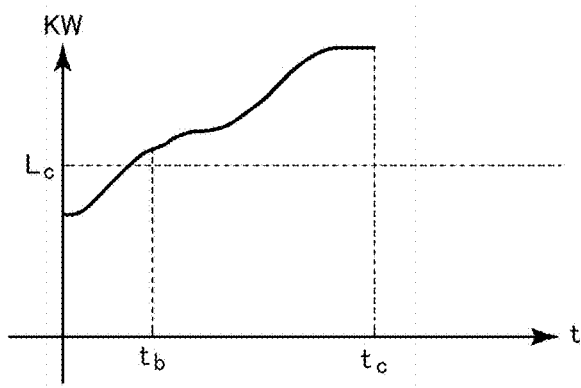
Figure 3:
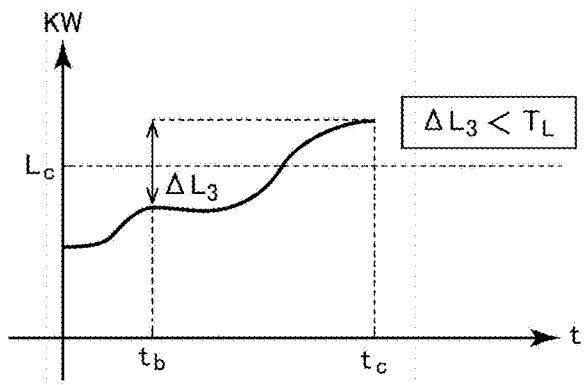

A case where the first determination unit 21 determines that the load application state has occurred and a cases where the first determination unit 21 does not determine that the load application state has occurred are exemplified below. FIG. 3 is a conceptual view showing a relationship between a temporal transition of the engine load and the determination result of the first determination unit 21 according to an embodiment of the present disclosure. In each of graphs shown in the figure, the horizontal axis is time and the vertical axis is the engine load indicated by a KW signal. Further, $t_c$ indicates current time, to indicates time before the prescribed time from the current time, and $L_c$ indicates the prescribed value of the engine load (the same also applies to graphs shown in FIGS. 6 and 8 described later). Furthermore, $T_L$ indicates a variation threshold of the engine load.

In a case shown in the upper graph of the figure, the engine load at the time to before the prescribed time is not greater than the prescribed value, and an increase ($\Delta L_1$) in the engine load from before the prescribed time to the present is not less than the variation threshold ($T_L$). Therefore, the first determination unit 21 determines that the load application state has occurred. This case corresponds to a case where a certain amount of the engine load is applied while the engine 5 is driven under low load. In such case, it is necessary to quickly increase the fuel injection amount to quickly respond to the increase in the engine load. In a case shown in the middle graph of the figure, the engine load at the time to before the prescribed time exceeds the prescribed value. Therefore, the first determination unit 21 determines that no load application state has occurred. This case corresponds to a case where the engine 5 has not been driven under low load before the prescribed time. In such case, the amount of air supply to the engine 5 and the fuel injection amount are secured to a certain extent. Therefore, it is relatively easy to achieve quick responsiveness of the engine drive to the increase in the engine load, without quickly increasing the fuel injection amount. Accordingly, there is little need to quickly increase the fuel injection amount. In a case shown in the lower graph of the figure, an increase ($\Delta L_3$) in the engine load from before the prescribed time to the present is below the variation threshold. Therefore, the first determination unit 21 determines that no load application state has occurred. This case corresponds to a case where the engine load applied to engine 5 during the low-load drive is small. In such case, if the fuel injection amount is quickly increased, the engine speed increases as the fuel injection amount increases, which may cause various problems such as unstable operation of the engine 5. Therefore, it is not preferable to quickly increase the fuel injection amount at such timing.

Returning to FIG. 2, the engine control device 20 according to an embodiment includes a feedforward determination unit (hereinafter referred to as the FF determination unit) 23 configured to accept the determination result of the first determination unit 21 and the FF fuel injection amount of the second calculation unit 32. Only if the determination result of the first determination unit 21 indicates the occurrence of the load application state, the FF determination unit 23 sends the FF fuel injection amount output by the second calculation unit 32 to the injection command unit 35. With this configuration, if the first determination unit 21 determines that the load application state has occurred, the engine control device 20 switches from the normal control mode to the load application control mode, and the fuel injection amount command value switches from the first fuel injection amount to the second fuel injection amount. The FF determination unit 23 may not be provided in the engine control device 20. For example, the calculation result of the second calculation unit 32 may be input to the first determination unit 21, and the function of the FF determination unit 23 may be included in the function of the first determination unit 21.

According to the above configuration, if the first determination unit 21 determines that the load application state has occurred in which the engine load before the prescribed time, which is not greater than the prescribed value, increases by not less than the variation threshold, the engine control device 20 switches to the load application control mode. That is, if the engine load which has remained at the low value increases to some extent, the injection amount command value switches from the first fuel injection amount to the second fuel injection amount, so the fuel injection amount increases quickly. Meanwhile, if the engine load before the prescribed time exceeds the prescribed value (i.e., there is little need to increase the fuel injection amount quickly) or if the increase in the engine load is less than the variation threshold, the fuel injection amount command value does not switch to the second fuel injection amount. Whereby, the rapid increase in the fuel injection amount at an unnecessary timing and the rapid increase in the fuel injection amount that would lead to the insufficient air excess ratio are suppressed. In view of the foregoing, the engine control device 20 is achieved which is capable of quickly increasing the fuel injection amount at an appropriate timing while suppressing the insufficient air excess ratio. The first determination unit 21 according to an embodiment determines whether the load application state has occurred, based only on the temporal transition of the engine load. The first determination unit 21 according to another embodiment does not determine that the load application state has occurred, unless another parameter such as the engine speed also satisfies a prescribed condition (details will be described later). In both of the embodiments, the above advantages can be obtained.

The first calculation unit 31 according to an embodiment is configured to maintain a feedback gain value in the FB calculation unchanged under the load application control mode. In the embodiment where the first calculation unit 31 executes the PID calculation, a PID gain value is maintained. The PID gain value may be the same value in both the normal control mode and the load application control mode. According to the above configuration, since a change in setting of the first calculation unit 31 due to switching from the normal control mode to the load application control mode is suppressed, it is possible to further suppress the rapid increase in the fuel injection amount at an unnecessary timing, while simplifying the calculation process by the first calculation unit 31.

Switching from the load application control mode to the normal control mode will be described. In the embodiment illustrated in FIG. 2, the switching occurs based on a determination result of a second determination unit 22 which is a component of the engine control device 20. The second determination unit 22 is configured to determine whether at least either of a first condition where the basic fuel injection amount is not less than the upper limit fuel injection amount decided from a characteristic value correlated with the air supply amount of the air supplied to the engine 5 or a second condition where the engine speed is not less than a prescribed rotation speed is satisfied.

The first condition will be described. The second determination unit 22 decides the upper limit fuel injection amount based on the detection results of the rotation speed sensor 12 and the boost pressure sensor 14. It is understood that the detection result of the boost pressure sensor 14 is a characteristic value having a high correlation with an actual air supply amount. If the basic fuel injection amount obtained by the FB calculation of the first calculation unit 31 is not less than the upper limit fuel injection amount, the fuel injection amount supplied to the engine 5 is sufficiently high, and there is little need to continue the control to quickly increase the fuel injection amount from the viewpoint of suppressing the insufficient air excess ratio of the engine 5. Since the first condition is included in the determination condition of the second determination unit 22, it is possible to suppress the increase in the fuel injection amount at such timing.

The second condition will be described. The second determination unit 22 determines whether the actual engine speed specified by the detection result of the rotation speed sensor 12 is not less than the prescribed rotation speed. If the actual engine speed is not less than the prescribed rotation speed, the engine 5 rotates at a certain rotation speed even if the actual fuel injection amount is not increased to the upper limit fuel injection amount, and the output power of the engine 5 is also not less than a certain level. Accordingly, there is little need to continue the control to quickly increase the fuel injection amount. Since the second condition is included in the determination condition of the second determination unit 22, it is possible to suppress the rapid increase in the fuel injection amount at such timing.

As described above, if the basic fuel injection amount output by the first calculation unit 31 is not less than the upper limit fuel injection amount, the actual fuel injection amount is sufficiently high, and there is little need for the injection amount command value to be the second fuel injection amount from the viewpoint of suppressing the insufficient air excess ratio of the engine 5. Further, if the actual engine speed is not less than the prescribed rotation speed without the basic fuel injection amount reaching the upper limit fuel injection amount, the engine 5 can rotate at a certain rotation speed without sufficiently increasing the actual fuel injection amount, so there is little need for the fuel injection amount command value to be the second fuel injection amount. In this regard, according to the above configuration, if at least either of the conditions is satisfied, the engine control device 20 switches from the load application control mode to the normal control mode, and the fuel injection amount command value switches from the second fuel injection amount to the first fuel injection amount. Therefore, it is possible to further suppress the rapid increase in the fuel injection amount at an unnecessary timing. The determination process of the second determination unit 22 may be executed if the first determination unit 21 determines that the load application state has occurred, or may be executed regardless of the determination result of the first determination unit 21. In the latter embodiment, the determination result of the second determination unit 22 is referred to after the first determination unit 21 determines that the load application state has occurred. In both of the embodiments, the above advantages can be obtained.

3. Exemplification of Configuration of First Determination Unit 21

Figure 4:
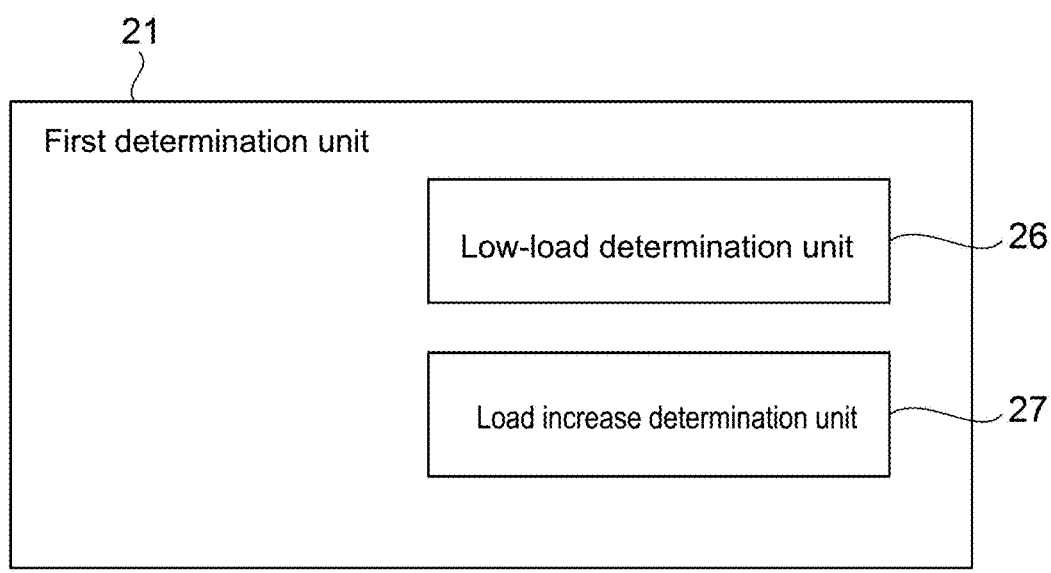
FIG. 4 is a conceptual diagram showing the configuration of the first determination unit according to an embodiment.

FIG. 4 is a conceptual diagram showing the configuration of the first determination unit 21 according to an embodiment of the present disclosure. The first determination unit 21 includes a low-load determination unit 26 for determining whether the engine load before the prescribed time is not greater than the prescribed value, and a load increase determination unit 27 for determining whether the increase in the engine load is not less than the variation threshold. The respective determination processes of the low-load determination unit 26 and the load increase determination unit 27 may be executed in parallel, or the determination process of the low-load determination unit 26 may be executed before or after the determination process of the load increase determination unit 27. Hereinafter, respective determination conditions of the low-load determination unit 26 and the load increase determination unit 27 will be described.

FIG. 5 is a conceptual table showing the determination conditions of the low-load determination unit 26 according to an embodiment of the present disclosure. The low-load determination unit 26 according to an embodiment is configured to determine that the engine load before the prescribed time is not greater than the prescribed value, if both conditions N1 and N2 are satisfied. The condition N1 is a condition where the engine load before the prescribed time is not greater than the prescribed value. The engine load before the prescribed time is acquired based on the detection result of the load sensor 11. The condition N2 is a condition where the actual engine speed is not greater than a second rotation speed threshold. The actual engine speed is acquired based on the detection result of the rotation speed sensor 12. The actual engine speed referred to in this determination is either an actual engine speed at present, an actual engine speed before the prescribed time, or an actual engine speed at any time from before the prescribed time to the present. An advantage of determining whether or not the condition N2 as well as the condition N1 is satisfied in determining whether the engine load before the prescribed time is not greater than the prescribed value will be described below.

Figure 6:
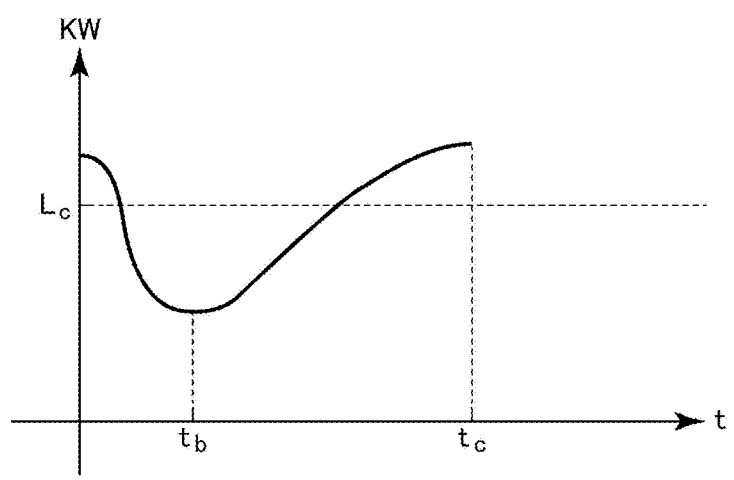
FIG. 6 is a graph conceptually showing the temporal transition of the engine load according to an embodiment.

FIG. 6 is a graph conceptually showing the temporal transition of the engine load according to an embodiment of the present disclosure. The graph shows a case where the engine load indicated by the KW signal suddenly drops due to an unexpectedly occurring factor, even though the engine 5 has not been driven under low load. The unexpectedly occurring factor includes, for example, intermittent misfire of the engine 5 or noise that affects the measurement of the load sensor 11. The engine load that suddenly drops is immediately restored to its original level if the intermittent misfire occurs, and the actual engine load does not fall below the prescribed value if the noise occurs. In these cases, the engine load before the prescribed time, which is indicated by the KW signal, is not greater than the prescribed value, even though the engine control device 20 switches to the load application control mode and the fuel injection amount need not increase rapidly. Meanwhile, the actual engine speed tends to remain high even if the unexpected factor exemplified above occurs. In this regard, according to the above configuration, the low-load determination unit 26 does not determine that the engine load before the prescribed time is not greater than the prescribed value, unless the actual engine speed is not greater than the second rotation speed threshold and the condition N2 is satisfied. Therefore, it is possible to suppress the rapid increase in the fuel injection amount at an unnecessary timing.

FIG. 7A is a conceptual table showing determination conditions of the load increase determination unit 27 according to an embodiment. The load increase determination unit 27 according to an embodiment is configured to determine that the increase in the engine load is not less than the variation threshold, if at least one load increase condition is fully satisfied. The load increase condition of the present example includes load increase conditions A1, A2, and A3. Hereinafter, individual determination conditions such as the load increase conditions A1, A2, and A3 may simply be referred to as the load increase condition when collectively referred to. The load increase condition A1 is a condition where a first load deviation which is a deviation between the engine load at present and the engine load before the prescribed time is not less than the variation threshold. The first load deviation is obtained by subtracting the engine load before the prescribed time, which is indicated by the detection result of the load sensor 11 from the engine load at present, which is indicated by the detection result of the current load sensor 11. The load increase condition A2 is a condition where the engine speed deviation is not greater than a first rotation speed threshold. The method of acquiring the engine speed deviation is as previously described. The load increase condition A3 is a condition where a second load deviation which is a deviation between the engine load at present and a processed engine load obtained by low-pass filtering the engine load before the prescribed time is not less than the variation threshold. The second load deviation is obtained by subtracting the processed engine load from the engine load at present.

According to the configuration where the load increase condition of the load increase determination unit 27 shown in FIG. 7A includes the load increase condition A1, the first load deviation as the deviation of the engine load is used to determine whether the increase in the engine load is not less than the variation threshold. Whereby, it is possible to ensure the accuracy of the determination by the load increase determination unit 27. The above advantages can be obtained regardless of whether the load increase condition includes at least either the load increase condition A2 or the load increase condition A3 in addition to the load increase condition A1. When the load increase condition includes only the load increase condition A1, it is determined that the increase in the engine load is not less than the variation threshold, if the one load increase condition A1 is fully satisfied.

Further, the load increase condition includes the load increase condition A2 in addition to the load increase condition A1. That is, the load increase determination unit 27 is configured to determine that the increase in the engine load is not less than the variation threshold, if the first load deviation is not less than the variation threshold and the engine speed deviation is not greater than the first rotation speed threshold. As described above, the engine load indicated by the KW signal sent to the load increase determination unit 27 may suddenly drop temporarily due to the unexpectedly occurring factor. In this case, the first load deviation is not less than the variation threshold even though the fuel injection amount does not actually need to increase rapidly. Meanwhile, the engine speed deviation tends to remain high even if the above-described unexpected factor occurs. In this regard, according to the above configuration, it is not determined that the increase in the engine load is not less than the variation threshold, unless the engine speed deviation is not greater than the first rotation speed threshold as the actual engine load increases by not less than the variation threshold. Therefore, it is possible to further suppress the rapid increase in the fuel injection amount at an unnecessary timing. The above advantages can be obtained regardless of whether the load increase condition includes the condition A3 in addition to the load increase conditions A1, A2.

Further, the load increase condition includes the load increase condition A3 in addition to the load increase condition A1. That is, the load increase determination unit 27 is configured to determine that the increase in the engine load is not less than the variation threshold when the first load deviation is not less than the variation threshold and the second load deviation is not less than the variation threshold. As described above, the engine load indicated by the KW signal sent to the load increase determination unit 27 may suddenly drop temporarily due to the unexpected factor. In this regard, according to the above configuration, since the engine load before the prescribed time, which is sent to the injection command unit 35, is subjected to low-pass filtering, a temporary sudden drop phenomenon is not reflected in the engine load acquired by the load increase determination unit 27. Whereby, the second load deviation is prevented from being not less than the variation threshold due to the unexpected factor, making it possible to further suppress the rapid increase in the fuel injection amount at an unnecessary timing. Further, respective determination thresholds for both the first load deviation and the second load deviation are the same variation threshold, making it possible to simplify the determination process by the load increase determination unit 27. The above advantages can be obtained regardless of whether the load increase condition includes the load increase condition A2 in addition to the load increase conditions A1, A3. Further, the determination threshold for the second load deviation may be a different value from the above-described variation threshold.

FIG. 7B is a conceptual table showing determination conditions of the load increase determination unit 27 according to another embodiment. The load increase condition according to another embodiment includes a load increase condition B1 in place of the load increase condition A1. Then, in the embodiment illustrated in the figure, the load increase determination unit 27 is configured to determine that the increase in the engine load is not less than the variation threshold, if the above-described load increase conditions A2 and A3 are both satisfied in addition to the load increase condition B1. Then, the load increase condition B1 is a condition where a derivative value of the engine load at present is not less than a derivative threshold. The load increase determination unit 27 acquires the derivative value of the engine load at present based on a deviation between the engine load at present and an engine load at a time backward from the present by a time equivalent to the reading frequency of the load sensor 11. The load increase determination unit 27 determines whether the load increase condition B1 is satisfied, by comparing the acquired derivative value with the derivative threshold as the prescribed value stored in the memory.

In the embodiment where the load increase condition includes the load increase condition B1, the load increase determination unit 27 is configured to determine that the increase in the engine load is not less than the variation threshold, if the derivative value of the engine load at present is not less than the derivative threshold. Advantages of this configuration will be described below.

Figure 8:
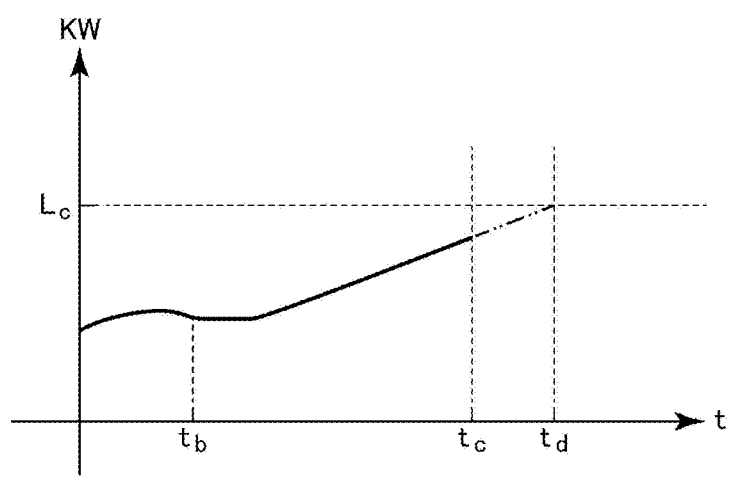
FIG. 8 is another graph conceptually showing the temporal transition of the engine load according to an embodiment.

FIG. 8 is another graph showing the temporal transition of the engine load according to an embodiment of the present disclosure. The graph shows a case where the engine load gradually increases while the engine 5 is driven under low load. In such case, the time of arrival is late although it is almost certain that the engine load will reach not less than the prescribed value in the future, delaying a timing at which the engine control device 20 switches from the normal control mode to the load application control mode (in the example of FIG. 8, time at which the engine control device 20 switches to the load application mode is ta which is later than $t_c$). In this regard, according to the above configuration, even if the rate of increase in the engine load is low, it is determined that the increase in the engine load is not less than the threshold, if the derivative value of the engine load is not less than the derivative threshold. Whereby, even if the rate of increase in the engine load is low, the engine control device 20 quickly switches to the load application control mode and can rapidly increase the fuel injection amount. The load increase condition may include only the load increase condition B1, or may include the load increase condition A1 in addition to the load increase conditions B1, A2, and A3. In both of the embodiments, the above advantages can be obtained.

4. Exemplification of Calculation Process of First Calculation Unit 31

The engine control device 20 (see FIG. 2) according to an embodiment may switch a parameter to be subject to the FB control between the normal control mode and the load application control mode. Specifically, under the normal control mode, the first calculation unit 31 outputs, as the basic fuel injection amount, the fuel injection amount obtained by the FB calculation based on the engine speed deviation. On the other hand, under the load application control mode, the first calculation unit 31 outputs, as the basic fuel injection amount, the fuel injection amount obtained by the FB calculation based on the deviation between the actual engine load and the target engine load of the engine 5 (not shown). The actual engine load is acquired based on the detection result of the load sensor 11. The target engine load is stored as a constant value in the memory configuring the engine control device 20, for example. According to the above configuration, with switching from the normal control mode to the load application control mode, the engine load is directly controlled by the first calculation unit 31. Whereby, it is possible to more finely control the engine load during the occurrence of the load application state.

In another embodiment, the engine speed may be subject to the FB control regardless of whether the engine control device 20 is in the normal control mode or the load application control mode.

5. Exemplification of Calculation Process of Second Calculation Unit 32

The FF fuel injection amount of the second calculation unit 32 according to another embodiment may be decided based on association data that associates the engine load with the fuel injection amount. The association data according to the present embodiment is data which is also referred to while the engine 5 is driven under rated engine load. The association data may be a data table which associates the engine load with the fuel injection amount, or may be a prescribed function expression. According to the above configuration, it is unnecessary to prepare dedicated data for obtaining the FF fuel injection amount. Therefore, it is possible to suppress the rapid increase in the fuel injection amount at an unnecessary timing, while simplifying the calculation process by the second calculation unit 32.

6. Load Variation Response Processing

Figure 9:
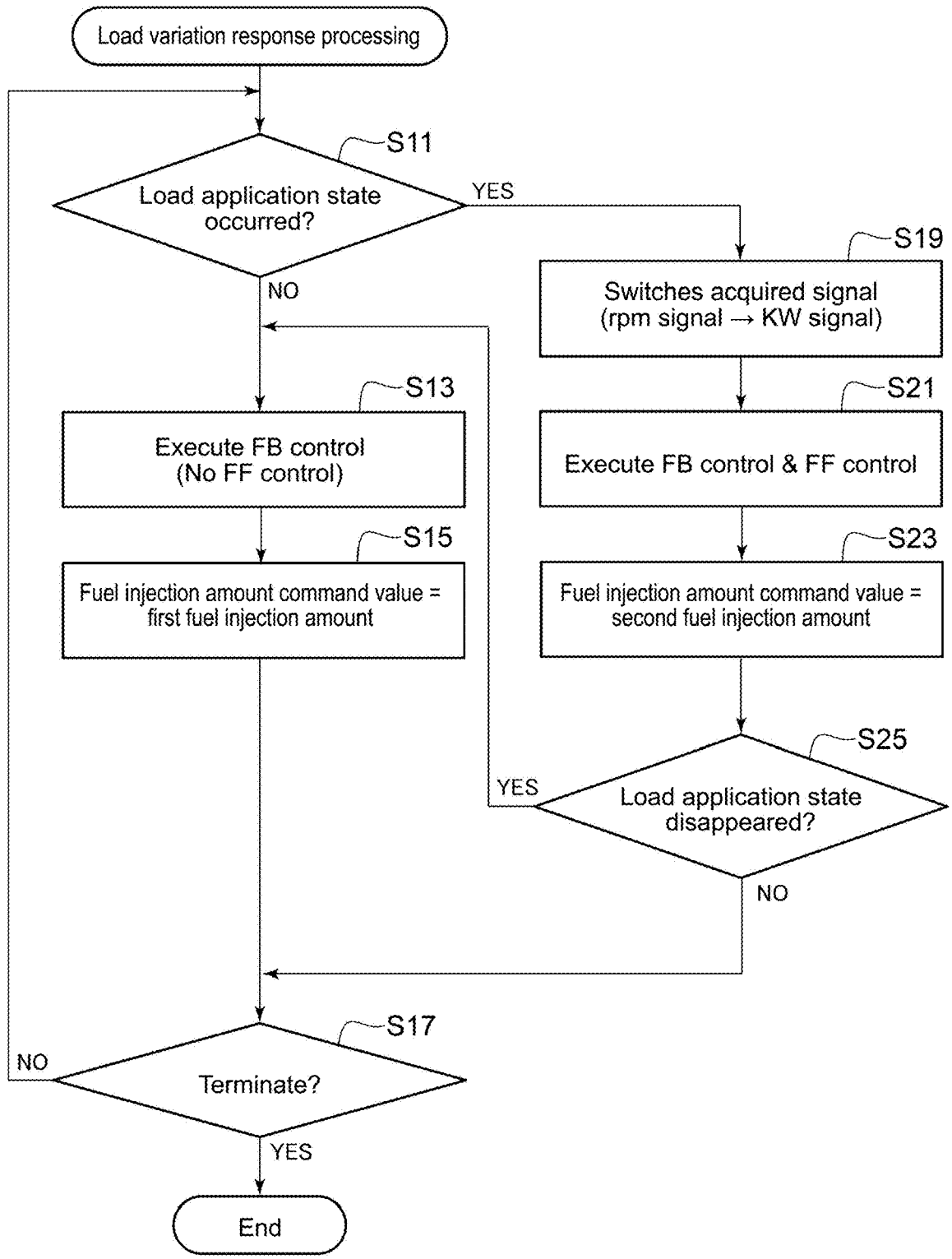
FIG. 9 is a flowchart showing load variation response processing according to an embodiment.

FIG. 9 is a flowchart showing load variation response processing according to an embodiment of the present disclosure. When the engine 5 starts the low-load drive, the load variation response processing is executed by at least one processor (hereinafter also simply referred to as the processor) mounted in the engine control device 20. In the following description, step may be abbreviated as "S". Further, it is assumed that the engine control device 20 is in the normal control mode at the start of the load variation response processing.

First, the processor determines whether the load application state has occurred in the engine 5 (S11). The details of this determination process are as described above, and S11 executed by the processor includes the determination process executed by the first determination unit 21 described above.

If it is determined that no load application state has occurred (S11: NO), the processor executes the FB control in which the fuel injection amount obtained by the FB calculation described above is treated as the basic fuel injection amount (S13). S13 executed by the processor includes the calculation process executed by the first calculation unit 31. When S13 is executed, the fuel injection amount obtained by the FF calculation based on the engine load at present is not added to the basic fuel injection amount. At this time, the FF calculation may be executed or may be stopped. In S13, the engine control device 20 is in the normal control mode.

The processor acquires the basic fuel injection amount output in S13 and outputs, as the injection amount command value, the first fuel injection amount calculated based on the basic fuel injection amount to the fuel injection part 9 (S15). In S15, the basic fuel injection amount may be treated as the first fuel injection amount, or data obtained by low-pass filtering the basic fuel injection amount may be treated as the first fuel injection amount. S15 executed by the processor includes an output process executed by the injection command unit 35 in the normal control mode.

Next, the processor determines whether to terminate the load variation response processing (S17). For example, if an instruction to end the drive of the engine 5 is input as data to the engine control device 20 (S17: YES), the processor terminates the process. If it is determined not to terminate the load variation response processing (S17: NO), the processor returns the process to S11. While the situation continues in which no load application state occurs, the processor sequentially repeats steps S11 to S15, and the engine control device 20 is maintained in the normal control mode.

If it is determined that the load application state has occurred (S11: YES), the processor switches a signal acquired to execute the FB calculation from the engine speed deviation to the first load deviation (S19). In an embodiment, the engine control device 20 switches from the normal control mode to the load application control mode at this time.

Subsequently, in addition to the FB control, the processor executes the FF control in which the FF fuel injection amount obtained by the FF calculation described above is reflected in the fuel injection amount command value (S21). In S21, the basic fuel injection amount obtained by the FB calculation and the FF fuel injection amount obtained by the FF calculation are input and output to the fuel injection part 9. S21 executed by the processor includes the calculation processes respectively executed by the first calculation unit 31 and the second calculation unit 32.

The processor outputs, as the injection amount command value, the second fuel injection amount calculated based on the fuel injection amount output in S21 (the value obtained by adding the FF fuel injection amount to the basic fuel injection amount) to the fuel injection part 9 (S23). In S23, a sum of the basic fuel injection amount and the FF fuel injection amount may be treated as the second fuel injection amount, or data obtained by low-pass filtering the sum may be treated as the second fuel injection amount. S23 executed by the processor includes an output process executed by the injection command unit 35 in the load application control mode.

The processor determines whether the load application state has disappeared (S25). The details of this determination process are as described above, and S25 executed by the processor includes the determination process executed by the second determination unit 22. If it is determined that the load application state has disappeared (S25: YES), the processor shifts the process to S13, and the engine control device 20 switches from the load application control mode to the normal control mode. Then, the parameter to be controlled by the FB control also switches from the engine load to the engine speed. On the other hand, if it is determined that the load application state has not disappeared (S25: NO), the processor shifts the process to S17. While the situation continues in which the load application state occurs, the processor sequentially repeats steps S11, S19 to S25, S17. At this time, if the parameter to be controlled by the FB control switches to the engine load deviation in S19, a skip process is executed in which no special control is executed.

In another embodiment, S19 may not be executed. In this case, if it is determined that the load application state has occurred (S11: YES), S21 is executed, thereby causing the engine control device 20 to switch from the normal control mode to the load application control mode.

7. Others

The engine 5 according to another embodiment may be coupled to a prime mover mounted on a vehicle, instead of being coupled to the electric generator 4. In this case, the load sensor 11 may be a torque sensor for measuring an output torque of the engine 5. Also in such embodiment, for example, idling drive of the vehicle corresponds to the low-load drive of the engine 5, and it is preferable that the fuel injection amount increases quickly at an appropriate timing in order to avoid the insufficient air excess ratio.

8. Conclusion

Some embodiments described above would be understood as follows, for instance.

1) An engine control device (20) according to at least one embodiment of the present disclosure, includes: an injection command unit (35) for outputting a fuel injection amount command value indicating a fuel injection amount supplied to an engine (5); a first calculation unit (31) for outputting a fuel injection amount obtained by feedback calculation based on an engine speed deviation which is a deviation between an actual engine speed and a target engine speed of the engine to the injection command unit as a basic fuel injection amount; a second calculation unit (32) for outputting a fuel injection amount obtained by feedforward calculation based on an engine load at present of the engine to the injection command unit as a feedforward fuel injection amount; and a first determination unit (21) for determining whether a load application state has occurred in which the engine load before a prescribed time, which is not greater than a prescribed value, increases by not less than a variation threshold. The engine control device is configured to switch from a normal control mode where the injection command unit outputs, as the fuel injection amount command value, a first fuel injection amount calculated based on the basic fuel injection amount to a load application control mode where the injection command unit outputs, as the fuel injection amount command value, a second fuel injection amount calculated based on a value obtained by adding the feedforward fuel injection amount to the basic fuel injection amount, if the first determination unit determines that the load application state has occurred.

According to the above configuration 1), if the load application state has occurred in which the engine load before the prescribed time, which is not greater than the prescribed value, increases by not less than the variation threshold, the engine control device switches to the load application control mode. That is, if the engine load which has remained at the low value increases to some extent, the injection amount command value switches from the first fuel injection amount to the second fuel injection amount, and the fuel injection amount increases quickly. Meanwhile, if the engine load before the prescribed time exceeds the prescribed value (i.e., there is little need to increase the fuel injection amount quickly) or if the increase in the engine load is less than the variation threshold, the fuel injection amount command value does not switch to the second fuel injection amount. Whereby, the rapid increase in the fuel injection amount at an unnecessary timing and the rapid increase in the fuel injection amount at a timing that would lead to the insufficient air excess ratio are suppressed. In view of the foregoing, the engine control device is achieved which is capable of quickly increasing the fuel injection amount at an appropriate timing while suppressing the insufficient air excess ratio.

2) In some embodiments, the engine control device as defined in the above 1), further includes: a second determination unit (22) for determining whether at least either of a condition where the basic fuel injection amount is not less than an upper limit fuel injection amount decided from a characteristic value correlated with an air supply amount of air supplied to the engine or a condition where the actual engine speed is not less than a prescribed rotation speed is satisfied. The engine control device is configured to switch from the load application control mode to the normal control mode, if the second determination unit determines that the at least either of the conditions is satisfied under the load application control mode.

If the basic fuel injection amount output by the first calculation unit is not less than the upper limit fuel injection amount, the actual fuel injection amount is sufficiently high, and there is little need for the injection amount command value to be the second fuel injection amount from the viewpoint of suppressing the insufficient air excess ratio of the engine. Further, if the actual engine speed is not less than the prescribed rotation speed without the basic fuel injection amount reaching the upper limit fuel injection amount, the engine can rotate at a certain rotation speed without sufficiently increasing the actual fuel injection amount, so there is little need for the fuel injection amount command value to be the second fuel injection amount. In this regard, according to the above configuration 2), if at least either of the conditions is satisfied, the engine control device switches from the load application control mode to the normal control mode, and the fuel injection amount command value switches from the second fuel injection amount to the first fuel injection amount. Therefore, it is possible to suppress the rapid increase in the fuel injection amount at an unnecessary timing.

3) In some embodiments, the engine control device as defined in the above 1) or 2), wherein the first calculation unit is configured to maintain a feedback gain value in the feedback calculation under the load application control mode.

According to the above configuration 3), since a change in setting of the first calculation unit due to switching from the normal control mode to the load application control mode is suppressed, it is possible to further suppress the rapid increase in the fuel injection amount at an unnecessary timing, while simplifying the calculation process by the first calculation unit.

4) In some embodiments, the engine control device as defined in any of the above 1) to 3), wherein the first determination unit includes: a low-load determination unit (26) for determining whether the engine load before the prescribed time is not greater than the prescribed value; and a load increase determination unit (27) for determining whether an increase in the engine load is not less than the variation threshold, wherein the load increase determination unit is configured to determine that the increase in the engine load is not less than the variation threshold, if at least one load increase condition is fully satisfied, and wherein the load increase condition includes a first load increase condition (load increase condition A1) where a first load deviation which is a deviation between the engine load at present and the engine load before the prescribed time relative to the engine load at present is not less than the variation threshold.

According to the configuration 4), since the first load deviation as the deviation of the engine load is used to determine whether the increase in the engine load is not less than the variation threshold, it is possible to ensure the accuracy of the determination by the load increase determination unit.

5) In some embodiments, the engine control device as defined in any of the above 1) to 4), wherein the first determination unit includes: a low-load determination unit (26) for determining whether the engine load before the prescribed time is not greater than the prescribed value; and a load increase determination unit (27) for determining whether an increase in the engine load is not less than the variation threshold, wherein the load increase determination unit is configured to determine that the increase in the engine load is not less than the variation threshold, if at least one load increase condition is fully satisfied, and wherein the load increase condition includes a second load increase condition (load increase condition B1) where a derivative value of the engine load at present is not less than a derivative threshold.

According to the above configuration 5), even if the rate of increase in the engine load is low, if the derivative value of the engine load is not less than the derivative threshold, it is determined that the increase in the engine load is not less than the threshold. Whereby, even if the rate of increase in the engine load is low and it takes a long time for the engine load to be not less than the prescribed value, the engine control device can quickly respond and can rapidly increase the fuel injection amount.

6) In some embodiments, the engine control device as defined in the above 4) or 5), wherein the load increase condition includes a third load increase condition (load increase condition A3) where a second load deviation which is a deviation between the engine load at present and a processed engine load obtained by low-pass filtering the engine load before the prescribed time is not less than the variation threshold.

The engine load indicated by the signal sent to the load increase determination unit may suddenly drop temporarily due to the unexpectedly occurring factor such as intermittent misfire of the engine or noise. In this regard, according to the above configuration 6), if the first load deviation is not less than the variation threshold and the second load deviation which is the deviation between the engine load at present and the processed engine load obtained by low-pass filtering the engine load before the prescribed time is not less than the variation threshold, it is determined that the increase in the engine load is not less than the variation threshold. Since the engine load before the prescribed time is subjected to low-pass filtering, a temporary sudden drop phenomenon is not reflected in the engine load acquired by the load increase determination unit. Whereby, it is possible to further suppress the rapid increase in the fuel injection amount at an unnecessary timing. Further, respective determination thresholds for both the first load deviation and the second load deviation are the variation thresholds, making it possible to simplify the determination process by the load increase determination unit.

7) In some embodiments, the engine control device as defined in any of the above 4) to 6), wherein the load increase condition includes a fourth load increase condition (load increase condition A2) where the engine speed deviation is not greater than a first rotation speed threshold.

The engine load indicated by the signal sent to the load increase determination unit may suddenly drop temporarily due to the unexpectedly occurring factor such as intermittent misfire of the engine or noise. In this case, the first load deviation is not less than the variation threshold even though the fuel injection amount does not actually need to increase rapidly. Meanwhile, the engine speed deviation tends to remain high even if the above-described unexpected factor occurs. In this regard, according to the above configuration 7), the load increase determination unit determines that the increase in the engine load is not less than the variation threshold, if the first load deviation is not less than the variation threshold and the engine speed deviation is not greater than the first rotation speed threshold. Therefore, it is not determined that the increase in the engine load is not less than the variation threshold, unless the engine speed deviation is not greater than the first rotation speed threshold as the actual engine load increases by not less than the variation threshold. Therefore, it is possible to further suppress the rapid increase in the fuel injection amount at an unnecessary timing.

8) In some embodiments, the engine control device as defined in any of the above 4) to 7), wherein the low-load determination unit is configured to determine that the engine load before the prescribed time is not greater than the prescribed value, if the engine load before the prescribed time is not greater than the prescribed value and the actual engine speed is not greater than a second rotation speed threshold.

The engine load indicated by the signal sent to the low-load determination unit may suddenly drop temporarily due to the unexpectedly occurring factor such as intermittent misfire of the engine or noise. In this case, the engine load before the prescribed time is not greater than the prescribed value even though the fuel injection amount does not actually need to increase rapidly. Meanwhile, the actual engine speed tends to remain high even if the above-described unexpected factor occurs. In this regard, according to the above configuration, it is not determined that the engine load before the prescribed time is not greater than the prescribed value, unless the actual engine speed is not greater than the second rotation speed threshold. Therefore, it is possible to further suppress the rapid increase in the fuel injection amount at an unnecessary timing.

9) In some embodiments, the engine control device as defined in any of the above 1) to 8), wherein the second calculation unit is configured to output, as the feedforward fuel injection amount, a fuel injection amount obtained based on the engine load at present and association data which is data referenced to at a rated engine load of the engine and associates the engine load with the fuel injection amount.

According to the above configuration 9), it is unnecessary to prepare dedicated data for obtaining the feedforward fuel injection amount. Therefore, it is possible to further suppress the rapid increase in the fuel injection amount at an unnecessary timing, while simplifying the calculation process by the second calculation unit.

10) In some embodiments, the engine control device as defined in any of the above 1) to 9), wherein the first calculation unit is configured to: output, as the basic fuel injection amount, the fuel injection amount obtained by the feedback calculation based on the engine speed deviation, under the normal control mode; and output, as the basic fuel injection amount, the fuel injection amount obtained by the feedback calculation based on a deviation between an actual engine load and a target engine load of the engine, under the load application control mode.

According to the above configuration 10), with switching from the normal control mode to the load application control mode, the engine load is directly controlled by the first calculation unit. Whereby, it is possible to more finely control the engine load during the occurrence of the load application state.

11) An engine control system (1) according to at least one embodiment of the present disclosure, includes: the engine; a rotation speed sensor (12) for detecting a rotation speed of the engine; a load sensor (11) for detecting the engine load of the engine; the engine control device (20) as defined in any of the above 1) to 10) for acquiring a detection result of each of the rotation speed sensor and the load sensor; and a fuel injection part (9) disposed in the engine and configured to inject fuel in accordance with the fuel injection amount command value output from the injection command unit of the engine control device.

According to the above configuration 11), for the same reason as the above 1), the engine control system is achieved which is capable of quickly increasing the fuel injection amount at an appropriate timing while suppressing the insufficient air excess ratio.

12) An engine control program according to at least one embodiment of the present disclosure, configured to cause an engine device (20) which is a computer to execute: an injection command step (S15, S23) of outputting a fuel injection amount command value which is a fuel injection amount supplied to an engine (5); a first calculation step (S13) of outputting, as a basic fuel injection amount acquired in the injection command step, a fuel injection amount obtained by feedback calculation based on an engine speed deviation which is a deviation between an actual engine speed and a target engine speed of the engine; a second calculation step (S23) of outputting, as a feedforward fuel injection amount acquired in the injection command step, a fuel injection amount obtained by feedforward calculation based on an engine load at present of the engine; and a first determination step (S11) of determining whether a load application state has occurred in which the engine load before a prescribed time, which is not greater than a prescribed value, increases by not less than a variation threshold. The engine control program causes the engine device to switch from a normal control mode where a first fuel injection amount calculated based on the basic fuel injection amount is output as the fuel injection amount command value in the injection command step to a load application control mode where a second fuel injection amount calculated based on a value obtained by adding the feedforward fuel injection amount to the basic fuel injection amount is output as the fuel injection amount command value in the injection command step, if the first determination step determines that the load application state has occurred (S19 or S21).

According to the above configuration 12), for the same reason as the above 1), it is possible to quickly increase the fuel injection amount at an appropriate timing while suppressing the insufficient air excess ratio.

REFERENCE SIGNS LIST

1: Engine control system
5: Engine
9: Fuel injection part
11: Load sensor
12: Rotation speed sensor
20: Engine control device
21: First determination unit
22: Second determination unit
26: Low-load determination unit
27: Load increase determination unit
31: First calculation unit
32: Second calculation unit
35: Injection command unit
A1, A2, A3, B1: Load increase condition

The invention claimed is:

1. An engine control device, comprising:
an injection command unit for outputting a fuel injection amount command value indicating a fuel injection amount supplied to an engine;
a first calculation unit for outputting a fuel injection amount obtained by feedback calculation based on an engine speed deviation which is a deviation between an actual engine speed and a target engine speed of the engine to the injection command unit as a basic fuel injection amount;

a second calculation unit for outputting a fuel injection amount obtained by feedforward calculation based on an engine load at present of the engine to the injection command unit as a feedforward fuel injection amount; and a first determination unit for determining whether a load application state has occurred in which the engine load before a prescribed time, which is not greater than a prescribed value, increases by not less than a variation threshold, wherein the engine control device is configured to switch from a normal control mode where the injection command unit outputs, as the fuel injection amount command value, a first fuel injection amount calculated based on the basic fuel injection amount to a load application control mode where the injection command unit outputs, as the fuel injection amount command value, a second fuel injection amount calculated based on a value obtained by adding the feedforward fuel injection amount to the basic fuel injection amount, if the first determination unit determines that the load application state has occurred.

2. The engine control device according to claim 1, further comprising:

a second determination unit for determining whether at least either of a condition where the basic fuel injection amount is not less than an upper limit fuel injection amount decided from a characteristic value correlated with an air supply amount of air supplied to the engine or a condition where the actual engine speed is not less than a prescribed rotation speed is satisfied, wherein the engine control device is configured to switch from the load application control mode to the normal control mode, if the second determination unit determines that the at least either of the conditions is satisfied under the load application control mode.

3. The engine control device according to claim 1, wherein the first calculation unit is configured to maintain a feedback gain value in the feedback calculation under the load application control mode.

4. The engine control device according to claim 1, wherein the first determination unit includes:

a low-load determination unit for determining whether the engine load before the prescribed time is not greater than the prescribed value; and a load increase determination unit for determining whether an increase in the engine load is not less than the variation threshold, wherein the load increase determination unit is configured to determine that the increase in the engine load is not less than the variation threshold, if at least one load increase condition is fully satisfied, and wherein the load increase condition includes a first load increase condition where a first load deviation which is a deviation between the engine load at present and the engine load before the prescribed time relative to the engine load at present is not less than the variation threshold.

5. The engine control device according to claim 1, wherein the first determination unit includes:

a low-load determination unit for determining whether the engine load before the prescribed time is not greater than the prescribed value; and a load increase determination unit for determining whether an increase in the engine load is not less than the variation threshold, wherein the load increase determination unit is configured to determine that the increase in the engine load is not less than the variation threshold, if at least one load increase condition is fully satisfied, and wherein the load increase condition includes a second load increase condition where a derivative value of the engine load at present is not less than a derivative threshold.

6. The engine control device according to claim 4, wherein the load increase condition includes a third load increase condition where a second load deviation which is a deviation between the engine load at present and a processed engine load obtained by low-pass filtering the engine load before the prescribed time is not less than the variation threshold.

7. The engine control device according to claim 4, wherein the load increase condition includes a fourth load increase condition where the engine speed deviation is not greater than a first rotation speed threshold.

8. The engine control device according to claim 4, wherein the low-load determination unit is configured to determine that the engine load before the prescribed time is not greater than the prescribed value, if the engine load before the prescribed time is not greater than the prescribed value and the actual engine speed is not greater than a second rotation speed threshold.

9. The engine control device according to claim 1, wherein the second calculation unit is configured to output, as the feedforward fuel injection amount, a fuel injection amount obtained based on the engine load at present and association data which is data referenced to at a rated engine load of the engine and associates the engine load with the fuel injection amount.

10. The engine control device according to claim 1, wherein the first calculation unit is configured to:

output, as the basic fuel injection amount, the fuel injection amount obtained by the feedback calculation based on the engine speed deviation, under the normal control mode; and output, as the basic fuel injection amount, the fuel injection amount obtained by the feedback calculation based on a deviation between an actual engine load and a target engine load of the engine, under the load application control mode.

11. An engine control system, comprising:

the engine;

a rotation speed sensor for detecting a rotation speed of the engine;

a load sensor for detecting the engine load of the engine;

the engine control device according to claim 1 for acquiring a detection result of each of the rotation speed sensor and the load sensor; and a fuel injection part disposed in the engine and configured to inject fuel in accordance with the fuel injection amount command value output from the injection command unit of the engine control device.

12. An engine control program configured to cause an engine device which is a computer to execute:

an injection command step of outputting a fuel injection amount command value supplied to an engine;

a first calculation step of outputting, as a basic fuel injection amount acquired in the injection command step, a fuel injection amount obtained by feedback calculation based on an engine speed deviation which is a deviation between an actual engine speed and a target engine speed of the engine;

a second calculation step of outputting, as a feedforward fuel injection amount acquired in the injection command step, a fuel injection amount obtained by feedforward calculation based on an engine load at present of the engine; and a first determination step of determining whether a load application state has occurred in which the engine load before a prescribed time, which is not greater than a prescribed value, increases by not less than a variation threshold, wherein the engine control program causes the engine device to switch from a normal control mode where a first fuel injection amount calculated based on the basic fuel injection amount is output as the fuel injection amount command value in the injection command step to a load application control mode where a second fuel injection amount calculated based on a value obtained by adding the feedforward fuel injection amount to the basic fuel injection amount is output as the fuel injection amount command value in the injection command step, if the first determination step determines that the load application state has occurred.

* * * * *